United States Patent [19]

Eigen et al.

[11] Patent Number: 5,582,665
[45] Date of Patent: Dec. 10, 1996

[54] PROCESS FOR SEALING AT LEAST ONE WELL OUT OF A NUMBER OF WELLS PROVIDED IN A PLATE FOR RECEIVING CHEMICAL AND/OR BIOCHEMICAL AND/OR MICROBIOLOGICAL SUBSTANCES, AND INSTALLATION FOR CARRYING OUT THE PROCESS

[75] Inventors: Manfred Eigen, Göttingen; Wolfgang Simm, Rosdorf, both of Germany

[73] Assignee: Max-Planck-Gesellschaft zur Förderung der Wissenschaften e.V., Göttingen, Germany

[21] Appl. No.: 378,925

[22] Filed: Jan. 25, 1995

Related U.S. Application Data

[63] Continuation of Ser. No. 969,823, filed as PCT/DE91/00081 Jan. 29, 1991, abandoned.

[30] Foreign Application Priority Data

Jul. 18, 1990 [DE] Germany .................. 40 22 793.6

[51] Int. Cl.⁶ .................. B29C 65/18; B65B 9/04
[52] U.S. Cl. .................. 156/69; 53/374.2; 53/453; 53/471; 53/478; 53/559; 156/292; 156/308.4
[58] Field of Search .................. 156/69, 581, 582, 156/308.2, 308.4, 292, 251; 53/452–454, 478, 471, 559, 560, 900, 374.2; 435/288.4, 305.3

[56] References Cited

U.S. PATENT DOCUMENTS

| | | |
|---|---|---|
| 3,251,463 | 5/1966 | Bodet et al. . |
| 4,012,888 | 3/1977 | Nichols . |
| 4,582,555 | 4/1986 | Bower . |
| 5,173,143 | 12/1992 | Fujii et al. .................. 156/581 |

FOREIGN PATENT DOCUMENTS

| | | |
|---|---|---|
| 0326846 | 8/1989 | European Pat. Off. . |
| 1880933 | 10/1963 | Germany . |
| 2608777 | 9/1977 | Germany . |
| 273833 | 2/1951 | Switzerland . |

OTHER PUBLICATIONS

Arbeitsmappe für den Verpackungspraktiker, "Maschinelles Verpacken", neue verpackung Aug. 1982, Prof. D. Berndt, Berlin, pp. 979–986.

*Primary Examiner*—Jeff H. Aftergut
*Attorney, Agent, or Firm*—Harness, Dickey & Pierce, P.L.C.

[57] ABSTRACT

A plate having wells therein for receiving chemical substances is provided with a coverplate covering said filled wells. The process for sealing the wells by providing a joining seam running around the wells provides the joining seam such that it has a profiled cross-section in order to increase the contact surface between the plate and the coverplate. To this end a welding die has a front surface provided with projecting profiled regions and being heated to a temperature in the region of the melting point of the coverplate. The welding die is placed on the coverplate means and remains there for a fixed first period. Then the welding die is pressed down through a fixed path and remains in this position for a fixed second period. Removing the welding die from the coverplate is the last step in the process.

11 Claims, 6 Drawing Sheets

PROCESS FOR SEALING AT LEAST ONE WELL OUT OF A NUMBER OF WELLS PROVIDED IN A PLATE FOR RECEIVING CHEMICAL AND/OR BIOCHEMICAL AND/OR MICROBIOLOGICAL SUBSTANCES, AND INSTALLATION FOR CARRYING OUT THE PROCESS

This is a continuation of U.S. patent application Ser. No. 07/969,823, filed as PCT/DE91/00081 on Jan. 29, 1991, now abandoned.

The invention relates to a process for sealing at least one well out of a number of wells which have their openings facing upwards and are provided in a plate and serve to receive chemical and/or biochemical and/or microbiological substances, the plate being deformable by the action of heat and the openings having their orifices in the upper side of said plate, wherein the process comprises the steps of:

a) Placing a coverplate, which is deformable by the action of heat, on the upper side of the plate, at least the opening of the at least one well to be sealed being covered by an area of the coverplate, which has its upper side facing upwards, and then b) providing a joining seam which runs at least round the opening of the well to be sealed and joins at least the area, covering the opening of the well to be sealed, with the plate.

A process of the above-mentioned kind is known from document DE-GM 18 80 933.

The invention also relates to an installation for sealing at least one well out of a number of wells which have their openings facing upwards and are provided in a plate and serve to receive chemical and/or biochemical and/or microbiological substances, the plate being deformable by the action of heat and the openings having their orifices in the upper side of said plate, wherein the installation comprises a receiving device for receiving the plate, which may be covered by a coverplate, a welding means for connecting said coverplate with said plate, and a delivery device for said welding means, via which device the welding means can be brought into contact with the coverplate covering the wells.

An installation of the above-mentioned kind is also known from document DE-GM 18 80 933.

The known process and the known installation serve for sealing plastic cups suitable for serial tests in diagnostics, in order to avoid loss of material, contamination or cross talk of the samples.

With the installation known from DE-GM 18 80 933 a cup block is provided having recesses corresponding to the cups for what concerns the arrangement and the form. For sealing the cups or wells the cup foil is placed in the cup block and covered by a coverplate. Further, a clamping rail is provided, which rail is moved towards the cup block via a delivery device such that the cover foil is pressed on the cup foil.

For sealing the cover foil with the cup foil a welding means is provided, which welding means comprise two heater bands, one of the heater bands being arranged in the cup block and the other heater band being arranged in the clamping rail. The heater bands consist of annular chain links being interconnected via ridges. In order to perform sealing the heater bands are heated pulsewise by a current pulse and produce thereby an even joining seam around each of the cups to be sealed from below the cup foil and from above the cover foil.

With the known process and the known installation PVC-foils can be sealed having eleven cups arranged in a line.

According to the finding of the applicant the known installation and the known process are not suitable for sealing cup foils having a thin foil size and/or a great number of cups. This is because with a great number of wells especially thin plates suffer great deformations in case the latter—as usual in the laboratory workday routine—are handled. The mechanical stress arising in this connection will lead to the cover foil working loose from the cup foil.

Further, this happens also in a case when inside of the cups an overpressure arises because the solutions placed in the cups were for example heated or carried to such high temperatures, that the air volume enclosed in the cups expands by a great amount.

Further plates having wells are marketed by several suppliers and are known as microtest plates or microtitre plates.

The known plates have a rigid base which is surrounded on all sides by a stand-up edge. Wells, which are arranged in rows and columns, are made in the more than one millimeter thick base from above. The known plates are supplied with wells of various volumes, which as a rule are between a few hundred microliters and a few milliliters.

It is known to cover the edge of the plate with a lid or an adhesive film in order to protect the wells and the interior space bounded by the edge against the ingress of contamination of any type.

The plates consisting of polystrene or polyvinyl chloride are used in order to keep solutions at constant temperature. This is effected either for storage purposes, for example in a refrigerator, or in order to allow a reaction to proceed at a specific temperature. For the latter, the plates are placed in an incubator, which as a rule is set at 37°.

The interior space closed off by the lid has a significantly larger volume than the wells themselves. If only a few of the wells are filled with solutions, moderate temperatures of about 50° C. are already sufficient to allow the solutions to dry up within a very short time. The reason is that the small volume of the solutions is not sufficient to generate a saturated water vapor atmosphere in the considerably larger interior space without a substantial loss in volume. For these reasons the known plates are only used at lower temperatures. Moreover, even at lower temperatures some of the wells are often filled with solutions known as "sacrificial solutions" in order to keep the loss in volume of the reaction solutions low.

In addition, conically tapered plastic reaction vessels which have a snap-on lid or a screw lid are known. It is known to provide the lid with a base which extends into the vessel in order to keep the volume of air above the solution placed in the reaction vessel low. In this way evaporation and condensation problems are largely avoided.

The known plastic reaction vessels are, however, as a rule several centimeters high and have an external diameter in the range of 12 to 18 mm. If the number of samples or solutions to be processed is large, the space requirements are correspondingly large, although each individual reaction volume is in the range of a few hundred microliters.

In the case of a large number of samples, which can rapidly be several hundred per day, it is also necessary to open and reclose a correspondingly large number of lids, which is very time consuming.

In addition it is known to heat-seal reaction solutions of small volumes in glass capillaries in order to be able to heat the solutions to high temperatures without significant evaporation problems. However, with this procedure the reaction solutions are strongly heated, so that this process, which is also very arduous and often not successful, cannot be used for many reaction solutions.

Many of the new chemical, biochemical or microbiological methods require that the reaction solutions are brought to different temperatures as the test proceeds. The temperatures required in these methods range from far below 0° C. to above 110° C. The reactions often have to follow a specific temperature profile cycle, which can consist of several heating and/or cooling operations. Especially in the case of enzymatic processes on nucleic acids, a change between high temperatures of about 100° C. for denaturing the nucleic acids and low temperatures of about 30° C. for initiating the reaction is required.

Further, from document "ARBEITSMAPPE FüR DEN VERPACKUNGSTECHNIKER, MASCHINELLES VERPACKEN, NEUE VERPACKUNG 8/82, pages 797–986" there are known bag forming, filling, and sealing machines for packing sheet pieces.

The known machines operate at a high clock rate and form a sheet foil into a bag which is then filled with the sheet pieces and sealed. The packings produced with the known machines are sealed via water vapor-tight or aroma-tight seams.

The seams are produced in that the packing material or the packing foil is transported through pairs of continuously heated sealing rolls, whereby the seams thereby produced are provided either with a longitudinal ribbing or with a transversal ribbing for producing tighter seams. The ribbings are produced by a respective profile of the sealing rolls.

With the known machines a packing material either sealing on one side or sealing on both sides is used, having mostly a cover of lacquer. Depending on the coating of the packing material fin seams or overlapping seams can be produced. The width of the sealing seams should be at least 12–15 mm.

It is not possible to use the known machines or the known process for sealing plates having wells with upwardly facing openings.

Therefore, it is an object of the present invention to provide a process of the kind mentioned at the outset, in which process the above-mentioned disadvantages are avoided. In particular, it should be possible to seal what may be a large number of reaction solutions, even of small volumes, in a simple operation in such a way, that not only the evaporation or condensation problems are reduced but that the sealed plates should further show a great mechanical burden without the sealing seams being opened.

According to the process mentioned at the outset this object is achieved in that the joining seam is produced with a profiled cross-section in order to increase the contact surface between the upper side of the plate and the coverplate.

According to the installation mentioned at the outset this object is achieved in that the welding means comprises at least one welding die, which has projecting profiled regions on its front face, and that the front face of the welding die faces towards the receiving device.

The object on which the invention is based is achieved in full in this way. Because, with the new process, the wells filled with solutions are covered by an area of the coverplate and sealed by the joining seam, the evaporation or condensation problem is solved in a way known as such. The volumes of air above the samples are only such that their moisture content can be controlled by the samples themselves when the temperature of the samples is changed, without significant changes in volume; the samples are thus under saturation pressure.

Due to the profiled cross-section of the joining seam the sealed plate has a high mechanical strain. When it is inserted in and removed from holding devices it is unavoidable that the plate will sag particularly in the case of a large number of wells. The new process now makes it possible safely to handle even a flexible plate containing a very large number of samples, which can be in the region of 1,000. Even when the solutions and/or substances placed in the well are heated the profiled joining seam will not work loose despite of the what may be a high overpressure inside of the wells.

Moreover, with the new process it is now possible to provide a large number of wells per plate and to seal said wells rapidly but nevertheless tightly using a single lid, by a joining seam.

In a preferred further development of the new process, the provision of the joining seam comprises the provision of a joining seam which is closed in itself.

This measure has the advantage that the wells are sealed liquid-tight, which is an advantage in particular in the case of toxic and/or infectious solutions.

It is particularly preferred with this process if the provision of the joining seam comprises the production of a join which is positive-locking, at least in sections, between the plate and the coverplate.

This measure enables a good mechanical hold of the coverplate to the plate, so that under normal handling there is no risk of the coverplate becoming detached again.

With this process, a further advantage is achieved if an individual joining seam is provided for each well.

This measure prevents the reaction solutions from different wells "creeping" via the upper side of the plate and mixing with one another. The solutions remain separate even if the sealed plate falls.

Furthermore, it is advantageous if the joining seam seals the well gas-tight.

This measure has the advantage that no exchange of moisture takes place between the volume placed in the well and the atmosphere, even at relatively high temperatures. Since the volume of air present above the reaction solution in the well is small, the evaporation problem is completely eliminated by this means.

In the case of this embodiment, it is also preferred if the provision of the joining seam comprises the following steps:

bb) placing a welding die, which has projecting profiled regions on its front face, with the front face on the upper side of the coverplate, the profiled regions coming into contact with the upper side around the area covering the opening; then bd) pressing down the welding die through a fixed path, so that the profiled regions at least penetrate into the coverplate; and then c) removing the welding die from the coverplate.

As a result of these measures, the production of the profiled seam is very simple. The process can be carried out rapidly, so that even a large number of wells can be sealed individually.

Furthermore, with this embodiment it is preferred if ba) before the welding die is placed in position, at least its front face is heated to a temperature which is in the region of the melting point of, at least, the cover film, if bc) after the front face of the welding die has been placed in position, the welding die is left in this position for a fixed first period and if be) after pressing down the welding die into the coverplate, the welding die is left in this position for a fixed second period.

By means of these measures, all the advantages listed hitherto are combined. The individually sealed wells are gas-tight even under high pressure. The joining seam does not open even when the joining seam is subjected to high mechanical stress, as can be generated by temperature stresses or sagging.

In the case of this illustrative embodiment, it is further preferred if the plate is placed on a receiving device before the joining seam is produced.

This measure offers the advantage that the plate is supported from below, so that the joining seams can more easily be produced in the correct position.

In the case of this illustrative embodiment it is further preferred if the receiving device is kept at a fixed temperature and the wells are brought into thermal contact with the receiving device when they are placed on the latter.

By keeping the wells at a controlled temperature it is possible to introduce into the wells even reaction solutions which must not depart from a specific temperature range and then to seal the wells.

According to a further development of this illustrative embodiment, the new process comprises placing a holding device from above onto the coverplate before the welding die is placed in position, which holding device presses the coverplate onto the upper side of the plate and brings the wells into close thermal contact with the receiving device.

As a result of this simple measure the joining seams can be made either simultaneously or successively. This is because the holding device prevents the joining seam which has not yet cooled down from opening again when the welding die is removed from the coverplate if the coverplate should remain partially caught on the welding die. The holding device thus ensures reproducibly good and tight joining seams. In the case of this illustrative embodiment it is also preferred if the plate is produced from a thin polycarbonate film having a thickness of less than 0.5 mm, if the coverplate is produced from a thin polycarbonate film having a thickness of less than 0.3 mm, if the wells have a wall with a thickness of less than 0.08 mm and a volume smaller than 200 m$^3$, if the fixed path is approximately equal to the thickness of the coverplate, if the first period is between 5 and 20 seconds, if the second period is between 1 and 5 seconds and if the temperature of the welding die is between 250° C. and 300° C.

The result of these measures is that the area covering the opening of the well bulges in a lens-like manner when the joining seam is made. This results in a simple manner in an optical test for gas-tightness, since only wells which are sealed gas-tight display this bulging. The plate used here and the cover film are particularly preferred, since they guarantee a rapid penetration of heat because of the wall thickness which is matched to the volume of the wells, the thermal conductivity of polycarbonate and the outer surface of the wells. Therefore, solutions which must be kept within a very narrow temperature range can also be sealed in the wells.

With the new installation a profiled joining seam is produced between the plate and the coverplate by the profiled welding die when the latter is advanced. This measure thus leads to a mechanically strong joining seam which holds even at high temperatures. In the event of the unavoidable sagging of a flexible plate containing a large number of wells mechanical stresses arise which subject the joining seams to severe strain. However, because of the profiled design of the joining seams these remain tight.

This embodiment is advantageously further developed if a welding die is provided for each well to be sealed.

This measure offers advantages inasmuch as the wells are all completely separate from one another. Even if the sealed plate falls, the solutions sealed in the wells do not mix.

Furthermore, in the case of this embodiment it is preferred if a heating device is provided for the at least one welding die.

As a result of this measure, joining seams are produced which are gas-tight even under high pressure and withstand high mechanical stress. This is because the hot welding die not only produces a relatively large contact surface between the coverplate and the plate, but, at least in sections, also produces an integral join. The contact pressure for the welding die which is required for this purpose depends on the level of the temperature of the welding die and is as a rule small.

In the case of this illustrative embodiment, a further advantage is achieved by the fact the heating device provided is a heating block made of metal, preferably made of copper, with which the dies are in thermal contact and into which the dies are fitted from below.

As a result of this measure all the welding dies can be heated at the same time, since the copper block has such a good thermal conductivity that no significant temperature gradient develops in the block.

This illustrative embodiment is further developed in a particularly advantageous way if a holding device which can be mounted on the receiving device is provided for the plate.

By means of this measure, slipping of the coverplate and the plate relative to one another is prevented in a simple manner. Since the coverplate is now lying tightly against the upper side of the plate, the residual volume of air above the solutions present in the wells is small.

An advantageous further development of this embodiment is characterized by an arrangement wherein the holding device is a perforated mask in which a through-hole is provided for each die, which through-hole is aligned centrally and in the longitudinal direction to a well to be sealed when the plate is arranged between the receiving device and the perforated mask.

By means of this measure it is achieved that the region which covers the opening of the well displays a lens-shaped bulging after the joining seam has been produced. Consequently a simple optical test for gas-tightness of the sealed well is possible.

In the case of this illustrative embodiment it is particularly preferred if the feeding means have an electrically controllable motor.

As a result of this measure there is a good and reproducible control of the welding die, so that the depth of penetration into the coverplate and the residence times on the plate can be adhered to very accurately.

A further advantage is achieved in the case of this illustrative embodiment if a cooling device is provided for the receiving device.

In this way it is also possible to fill the wells with solutions which must not depart from a specific temperature range and to seal them in with the coverplate. The heat which may be transported into the solutions during production of the joining seam is instantaneously dissipated by the temperature-controlled receiving device.

In the case of this illustrative embodiment it is further preferred if a negative mold of the wells is arranged on the receiving device, which negative mold can be brought to engage with the wells, which have protuberances projecting downwards beneath the plate.

This measure has the advantage that the wells are in close thermal contact with the receiving device, so that even solutions which have to maintain a very narrow temperature range, or even are to be kept at temperatures below 0°, can be sealed in the wells.

Furthermore, in the case of this illustrative embodiment it is preferred if the installation has a baseplate on which a receiving block containing cups as the negative mold is arranged as holding device, if a top plate which carries the motor and is joined to the baseplate via guide rods is arranged above the baseplate, if a support plate, which is controlled by the guide rods and is connected to the motor via gearing means and on which the heating block is arranged facing downwards, is arranged between the baseplate and the top plate, and if a cooling device is provided for the support plate.

These measures give the installation a simple, compact mechanical construction with which, as a result of the cooling and guiding of the support plate, jam-free feeding of the welding die is possible.

In the case of this illustrative embodiment it is furthermore preferred if the projecting profiled regions have pyramids which are arranged in the form of a ring and at their base are constructed as a single piece with the welding die and have their tips facing away from the welding die, and if the pyramids delimit between them a recess which has a larger cross-section than the openings of the wells.

These measures offer the advantage that, because of the high profiling of the front face of the welding die, the contact surface with the plate is increased in a simple manner when the welding die penetrates into the coverplate. Although it is also possible for the profiling to have a corrugated form, this zig-zag form of profiling has proved suitable. Because the pyramids are formed as a single piece with the die, a good temperature control is also ensured.

In the case of this illustrative embodiment it is further preferred if the pyramids are arranged in rows offset relative to one another.

When the welding die penetrates into the coverplate, the offset rows produce a corresponding negative profile, which constitutes a high flow resistance for gas molecules which wish to escape from the sealed well. This design of the welding die produces a joining seam which is gas-tight even at high temperature.

A further advantage is achieved in the case of this illustrative embodiment by the fact that the pyramids have a height, measured between their base and their tip, which is greater than the thickness of the coverplate.

By means of this measure it is achieved that when the welding die is advanced the material of the coverplate partially penetrates into the upper side of the plate. This yet again leads to a mechanically stronger joining seam.

Further advantages are apparent from the description and the appended drawing.

It is obvious that the features which have been mentioned above and which are still to be explained below can be used not only in the particular combination indicated but also in other combinations or alone, without departing from the scope of the present invention.

One illustrative embodiment of the invention is shown in the drawing and is explained in more detail in the following description. In the drawing.

Figure 1:
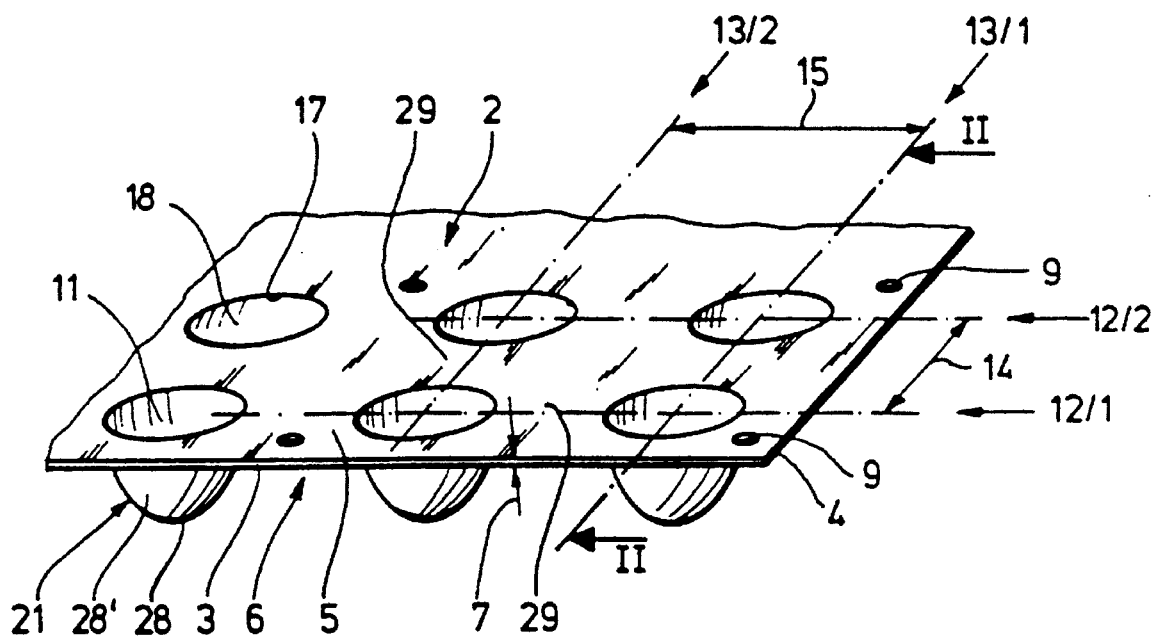
FIG. 1 shows the plate according to the invention with the wells open towards the top, in section and in a perspective view.

In FIG. 1 a rectangular flexible plate 2 is shown in section with one of its longitudinal edges 3 and one of its side edges 4. The plate 2, which may for example be made of a rigid plastic film, has a plane upper side 5 and an underside 6 parallel thereto. Its thickness, measured between the upper side 5 and the underside 6 is indicated at 7. As can be seen in FIG. 1, the thickness 7 is small compared with the transverse dimensions of the plate 2.

Through-holes 9 are provided and wells 11, which are open towards the top, are formed in the plate 2. The wells 11 are arranged in rows 12 and columns 13, the rows 12 running parallel to the longitudinal edge 3 and the columns 13 parallel to the side edge 4. The rows 12 and columns 13 each have a mutual row spacing or column spacing, indicated at 14 and 15 respectively. In the illustrative embodiment shown, the wells 11, which are of circular cross section, have an internal diameter 16, which can be better discerned in Fig. 2. The row spacings 14 and the column spacings 15 are identical, the internal diameter 16 of the wells 11 of course being smaller than the row spacing 14 or the column spacing 15.

The wells 11 lie with their openings 18, which are surrounded by a rounded opening edge 17, in the plane of the upper side 5 of the plate 2. They have a wall 20 which delimits their interior space 19 and is constructed in the manner of a beaker-like protuberance 21 and for each of the wells 11, which are identical to one another, lies below the underside 6 of the plate 2.

In the remainder of the description "upwards" will be used to indicate the direction out of the interior space 19 of the wells 11 through the opening 18 and "downwards" accordingly will be used to indicate the opposite direction.

Figure 2:
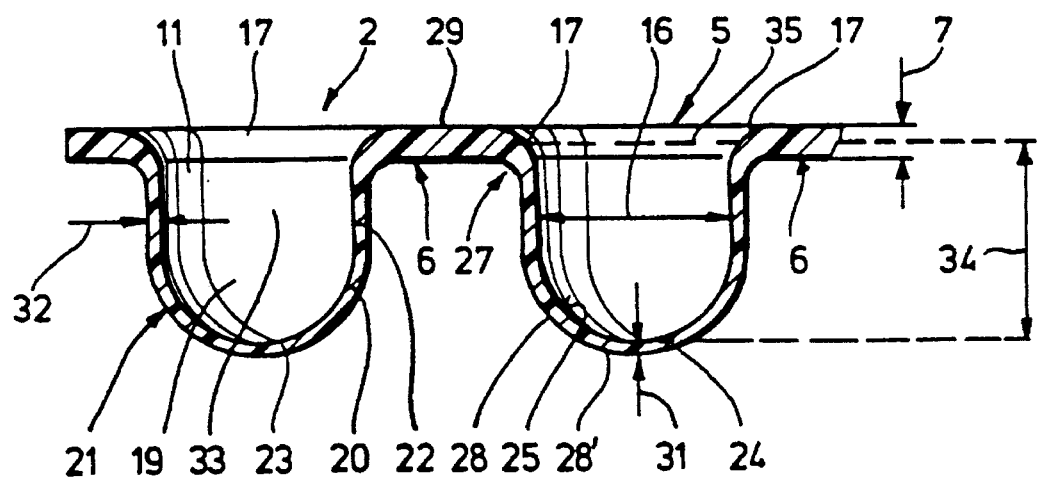
FIG. 2 shows the plate from FIG. 1, in a sectional view along the line II—II from FIG. 1.

As can be better discerned in FIG. 2, the protuberance 21 has a hollow cylindrical upper section 22 and a hemispherical lower section 23 integral therewith, the curved bottom wall 24 of said lower section closing off the well 11 at the bottom. The upper side 5 merges directly as inner surface 15 into the interior space 19 of the well 11, forming at the transition the peripheral rounded edge 17, while the underside 6 runs, as the outside 28 of the protuberance 21, essentially parallel to the curved inner surface 25, forming a neck groove 27 surrounding the protuberance 21. Bridges 29, which separate the individual openings 18 from one another, run between the individual wells 11.

As can further be seen in FIG. 2, the bottom wall 24 has the thickness, indicated at 31, which is measured between the inner surface 25 and the outside 28. In the region of the hollow cylindrical upper section 22, a correspondingly measured thickness, which is approximately equal to the thickness 31, is indicated at 32. The wells 11 each have a volume 33, which is essentially determined by their depth, indicated at 34, and the internal diameter 16. The depth 34 is measured between the bottom wall 24 and an imaginary maximum filling height indicated at 35 by a dashed line. The filling height 35 is approximately at the height at which the curved opening edge 17 merges into the vertical inner surface 25. Because of the surface tension and the precurvature associated therewith, the fill volume of the substances to be received will be smaller than the maximum volume 33, especially when the volume 33 is small.

The wells 11 of the plate 2 described thus far serve to receive chemical and/or biochemical and/or microbiological substances, which are stored or subjected to a reaction in the wells 11. The volume 33 and the number of wells 11 per plate 2 depend on the substances to be received in the wells 11. In addition to the internal diameter 16 and the depth 34, the row spacing 14 and the column spacing 15 are also largely determined by the volume 33. The thickness 7 of the plate 2 in the region of the bridges 29 is so chosen that the plate 2 has an adequate strength despite the closely adjacent wells 11 and does not break through buckling when being transported with filled wells 11. The thicknesses 31 and 32 of the wall 20 of the wells 11 are so chosen from the mechanical standpoint that the filled wells 11 do not start to tear or even tear off under the weight of the substances received therein.

In addition to the purely mechanical standpoint, the material from which the plate 2 is made and the thicknesses 31 and 32 of the wall 20 are also chosen from physical standpoints. The thicknesses 31 and 32, which—as can be seen in FIG. 2—are considerably less than the thickness 7, enable good transport of heat into the interior space 19 of the wells 11 and out of the interior space 19. By this means it is possible to cool or to change the temperature of the substances in the wells very rapidly, as the entire outside 28 is brought into contact, as a heat exchange surface 28', with a temperature-control material which is at the particular temperature desired.

In the illustrative embodiment chosen, the plate 2 is made of polycarbonate and has a thermal conductivity of $\lambda=0.21$ W per Kelvin and per meter. The thickness 7 is about 0.27 mm and for the thickness 31: $x=0.04$ mm. The spacings 14 and 15 between the rows 12 and, respectively, the columns 13 are about 10 mm and the volume 33 of the wells 11 is $V=85$ μl. The size of the heat exchange surface 28' corresponds to the outside 28 and is: $A=75$ mm². In accordance with the equation $$W = \frac{A \cdot \lambda}{V \cdot x}$$

a heat transfer coefficient of about $4.5 \times 10^{31\ 3}$ W/(K mm³) results using these figures.

It has been found that for such a heat transfer coefficient the heat exchange through the wall 20 takes place so rapidly that the determining time factor is the heat conduction in the substances themselves.

Thus, the novel plate 2 enables, for example, a large number of reactions to be carried out in separate wells 11 within a small space, it being possible to achieve very good thermal control of the reactions through the wall 20 of the wells.

Moreover, the material of the plate 2 is so chosen that optical analytical procedures, such as, for example, absorption measurements or fluorescence measurements, are possible through the wall 20 of the wells 11. For this purpose, the material must be transparent in the light wavelength range of interest, i.e it must display neither significant absorption nor fluorescence emission in this wavelength range.

Figure 3:
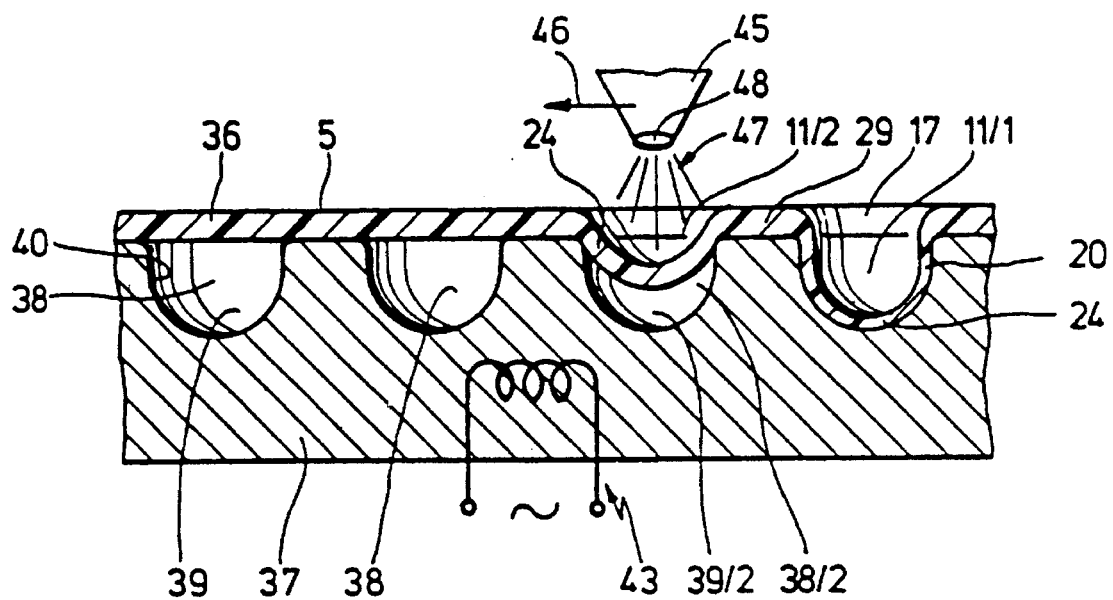
FIG. 3 shows a process for the production of the plate from FIG. 1, in a diagrammatic representation.

With reference to FIG. 3, a process for the production of the plate 2 from FIG. 1 will now be described. The starting material is a thin film 36, for example made of a polycarbonate, which has a thickness 7. This film 36 is placed on a temperature-controlled shaping block 37, in which blind holes 38, open towards the top, are provided, which holes, like the wells 11, are arranged in rows 12 and columns 13. The blind holes 38 have a wall surface 40 which surrounds their interior 39 and is smooth and coherent. The dimensions of the blind holes 38 are so chosen that they correspond to the external dimensions of the protuberances 21 to be formed: in the chosen example the blind holes have a diameter of about 6 mm and a depth of about 4 mm.

A heater, indicated diagrammatically at 43, is provided in the shaping block 37, which is made of metal, for example aluminum, the shaping block 37 being heated uniformly to 100° C. by said heater. An air nozzle 45, which is moveable in the direction of the arrow 46, is arranged above the shaping block 37 in the direction of the blind holes 38. The direction 46 is parallel to the columns 13 or the rows 12, so that the air nozzle 45 can be positioned centrally above each individual blind hole 38. The direction 46 is also aligned parallel to the upper side 5 of the film 36 placed on the shaping block 37, so that the spacing between the air nozzle and the upper side 5 remains constant.

The air nozzle 45 releases a jet 47 of hot air which is at about 280° C. and issues downwards at a velocity of about 2–5 m/sec from its outlet orifice 48 approximately vertically to the shaping block 37. The outlet orifice 48 has a diameter of about 5 mm and is 4 mm above the upper side 5 of the film 36. The air nozzle 45 is positioned successively centrally above the individual blind holes 38, where it remains stationary for about 3 to 5 seconds. By means of the jet 47 of hot air impinging on the upper side 5, the film 36 is heated to such an extent that it is plastically deformable.

The jet 47 of hot air then blows that area of the film 36 originally located above the blind hole 38 into the interior 39 of the particular blind hole, this area gradually stretching and the original thickness 7 of the film 36 becoming ever smaller in this area until, finally, the wall 20 of the well 11 formed has the thicknesses 31 and 32 indicated in FIG. 2.

In FIG. 3 the righthand well 11/1 has already been completely formed and the air nozzle 45 is located above the blind hole 38/2, in which the well 11/2 is just being formed. The bottom 24 of the well 11/2 has already partly moved into the interior 39/2 of the blind hole 38/2 and subsequently will lie with its entire surface against the smooth inner wall of the blind hole 38/2. As can be seen in FIG. 3, the bridge 29, which has the original thickness 7 of the film 36, remains between the wells 11/1 and 11/2. When forming the wells 11, the occluded air escapes without the formation of bubbles.

Of course, it is possible to use, instead of one air nozzle 45, several parallel air nozzles 45, the outlet orifices 48 of which are arranged in the grid pattern of the columns 13 or the rows 12. In this way, depending on the number of air nozzles 45, all the wells 11 of one row 12 or also of one column 13 can be produced at the same time.

As has already been described above, the film 36 consists of a polycarbonate having a thickness of 0.27 mm. Before forming the wells 11, the film 36 has a milky turbidity. However, it has been found that when the temperature of the jet 47 of hot air is 280° C. and the temperature of the shaping block 37 is 100° C. the film 36 becomes transparent in the region of the wall 20 of the completely formed wells 11, as is required for the above-mentioned optical analytical methods. Bringing the shaping block 37 to a controlled temperature of 100° C., which is not necessary for the actual forming of the wells 11, has the additional effect that the outside 28 of the well 11 lies fully against the wall surface 40 of the particular blind hole 38. By this means it is achieved that the outside 28 of each individual well 11 also has a smooth and uniform surface, which is of great advantage for changing the temperature of substances placed in the wells 11. The reason is that the protuberances 21 have virtually identical contours, so that they can be brought, with their heat exchange surface 28', into direct contact with correspondingly shaped counter-surfaces in the blind hole bores 38 without any layers of air interfering with the heat transfer. This is also described further below with reference to FIG. 10.

Figure 4:
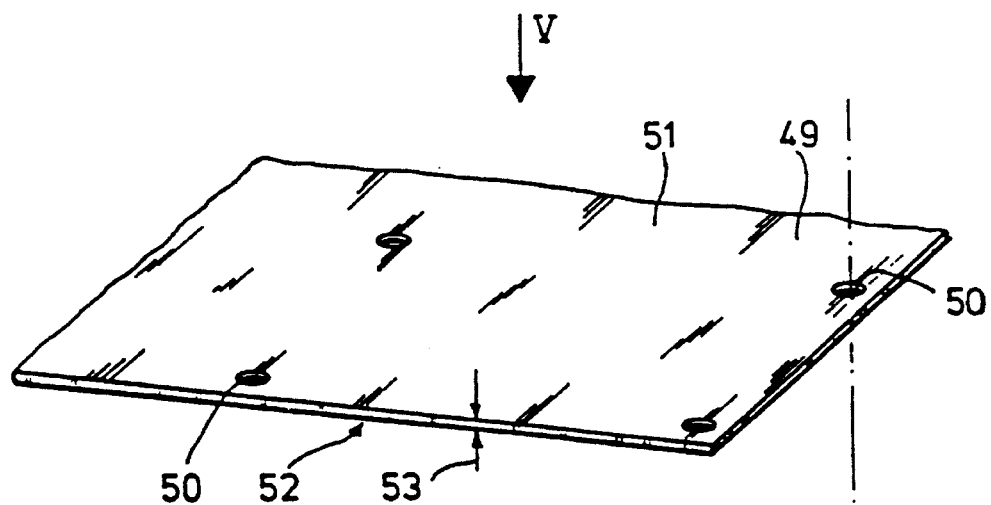
FIG. 4 shows the covering of a plate according to FIG. 1 with a cover film, in section and in a perspective view.
Figure 4:
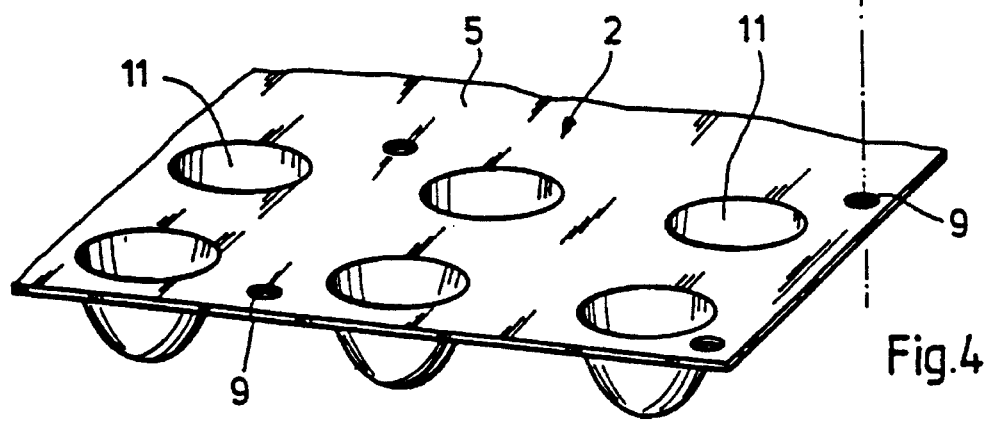

Especially if the volume 33 of the wells 11 is small, the wells 11 should be sealed against the outside atmosphere. For this purpose, a coverplate shown in FIG. 4 is provided which consists of a thin cover film 49. Through-holes 50, which are arranged in the same grid pattern as the through-holes 9 in the plate 2, are provided in the cover film 49. The cover film 49 has a plane upper side 51 and an underside 52 which is parallel thereto and with which the film comes to lie on the upper side of the plate 2 when the latter is covered. The cover film 49 has a thickness 53, measured between the upper side 51 and the underside 52, which is small compared with the transverse dimensions of the cover film 49. The cover film 49 is, for example, made of a polycarbonate having a thickness of 0.1 mm.

When it is placed on the plate 2, the cover film 49 is aligned such that the through-holes 50 are aligned with the through-holes 9. In this way, the cover film 49 and the plate 2 can simultaneously be joined to one another and be fixed to a support device, in a manner which will be described in more detail.

Of course, instead of the through-holes 50 or the through-holes 9, it is possible to provide cylindrical pegs which project downwards or, respectively, upwards and which engage in the through-holes 9 or, respectively, the through-holes 50 when the cover film 49 is placed on the plate 2 and thus join the cover film 49 to the plate 2 in a detachable manner.

The material preferably used for the cover film 49 is, as already mentioned, a polycarbonate having a thickness of 0.1 mm. This film is transparent in the wavelength range of interest for the optical analytical methods used and displays only slight inherent fluorescence. The optical analytical methods can thus also be applied from above through the cover film 49; in particular it is possible, using the irradiation method through the cover film 49 and the bottom wall 24 of the wells, to measure the optical density of the substances placed in the wells 11.

In the case of the preferred small volumes 33 of the wells 11, which are in the range between 30 and 100 µl, the volume of solutions placed in the wells 11 can change as a result of condensation and/or evaporation effects. This applies in particular if frequent changing of the temperature of the solutions between high and low temperatures is required, as occurs in the case of the polymerase chain reaction (PCR), a method frequently used for high amplification of individual nucleic acid strands.

Figure 5:
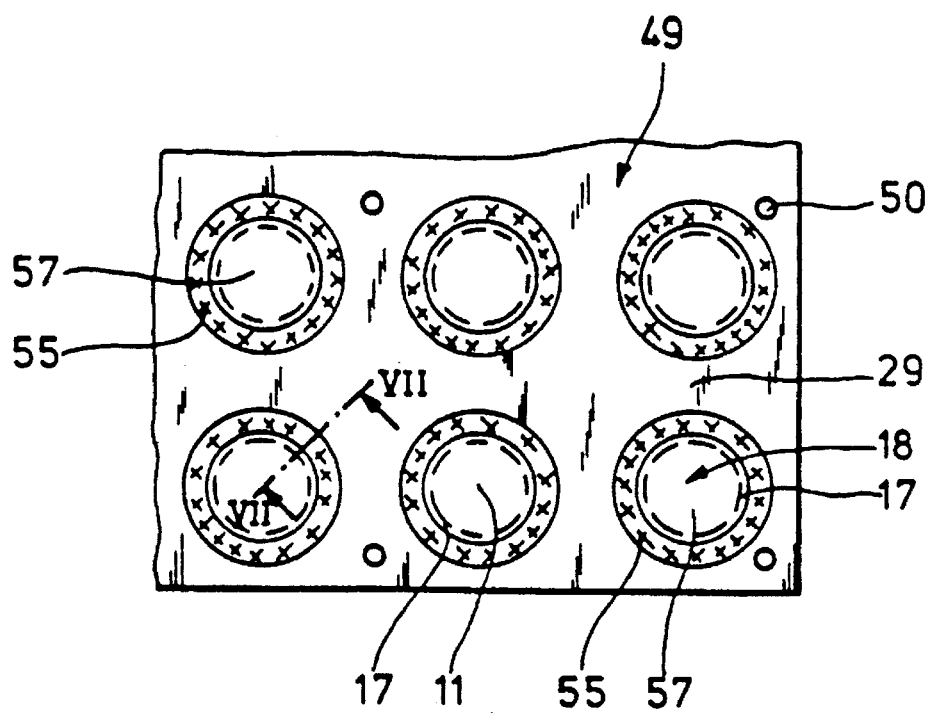
FIG. 5 shows the covered plate from FIG. 4 with circular joining seams which are positioned around the wells and join the cover film to the plate, as seen in the direction of the arrow V from FIG. 4.

In order to increase the sealing effect of the cover film 49, the cover film 49 is joined to the plate 22 in the region of each well 11 by a closed circular joining seam 55 surrounding the opening edge 17 of the well. In FIG. 5 it can be seen that each joining seam 55 bounds a circular area 57 of the cover film 49, which in each case covers the opening 18 of an assigned well 11. In this way each well 11 is so to say covered by its own lid in the form of the circular area 57, which, by means of the joining seam 55 is joined in such a way with the bridges 29 surrounding the well 11 that each well 11 is sealed gas-tight against the atmosphere and the other wells 11.

Figure 6:
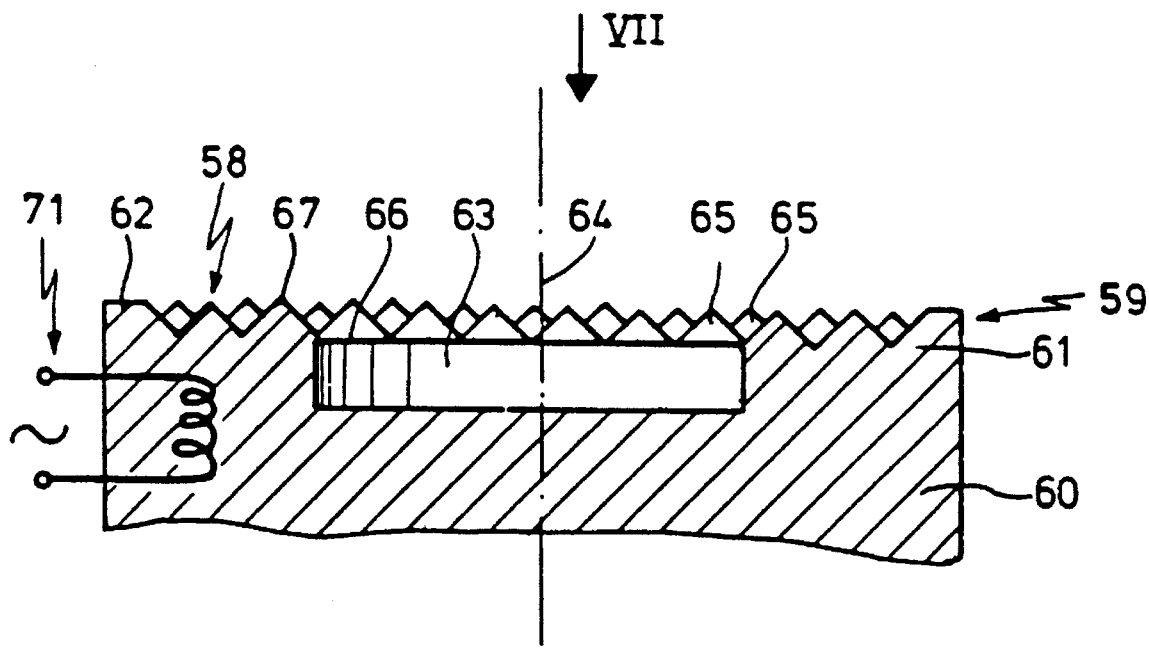
FIG. 6 shows a welding die for producing the joining seams from FIG. 5, in a sectional partial view.

A welding die 59 which is profiled on its front face 58 and is shown in section in FIG. 6 serves, for example, for making the individual joining seams 55. The welding die 59 has a solid cylindrical base body 60, which at its upper end 61 carries an annular attachment 62 which is integral with the base body 60. The annular attachment 62 delimits a circular recess 63, which is concentric with the base body 60 and thus with its longitudinal axis 64, and carries the ring-shaped front face 58 facing away from the base body 60.

Profiling in the form of pyramids 65 arranged in rows, which pyramids are constructed in one piece with the annular attachment 62 at their square base 66, is provided on the front face 58 which surrounds the recess 63 in ring form. The tips 67 of the pyramids 65 face away from the base body 60 in a direction parallel to the longitudinal axis 64 of the welding die 59.

Figure 7:
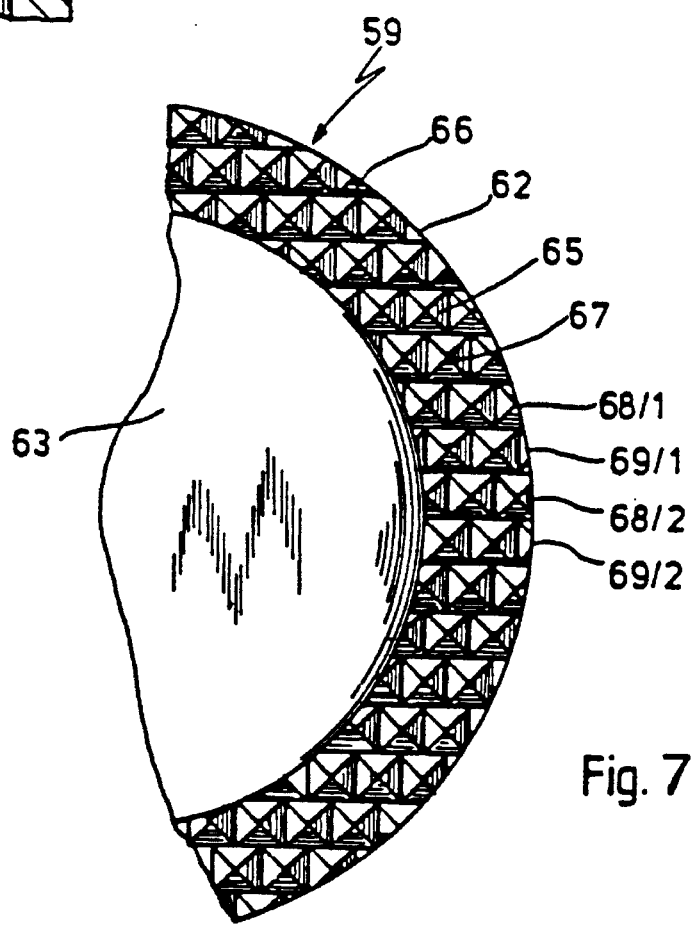
FIG. 7 shows the welding die from FIG. 6, in a partial view from above along the arrow VII from FIG. 6.

FIG. 7. shows the top view on the front face 58 in the direction of the arrow VII from FIG. 6 in section. As can be seen, the pyramids 65 are arranged in rows 68 and 69 which are offset relative to one another by half the width of the pyramid base 66. The arrangement is such that a row 69/1 runs between two rows 68/1 and 68/2, which are parallel to one another and are not offset relative to one another, which row 69/1 is accordingly offset relative to the rows 68/1 and 68/2 by half the width of the pyramid base 66. The row 68/2 is directly followed, remote from the row 69/1, by a row 69/2, which is parallel to the row 69/1 and aligned laterally with respect to the latter.

Returning to FIG. 6 it can be seen that the welding die 59 is provided with a heater, indicated diagrammatically at 71, by means of which the welding die 59, which is preferably made of V2A steel, is heated to about 280° C. In order to make the joining seam 55, the heated welding die 59 is placed from above onto the upper side 51 of the cover film 49, which is laid on the plate 2, in such a way that its profiled, ringrshaped front face 58 centrally surrounds the edge 17 of the opening of the well 11 which is located below the cover film 49 and is to be sealed. The circular recess 63 has a diameter which is so large that the tips 67 of the pyramids come to lie outside the edge 17 of the opening on sections of the cover film 49 which are located above the bridges 29.

The square base 66 of the pyramids 65 measures 0.5×0.5 mm and the tip 67 of the four-sided pyramid 65 lies 0.25 mm vertically above the pyramid base 66, i.e. two sides of a pyramid which are opposite one another enclose a vertical and opposite angle of 90°. In the radial direction up to three pyramids 65 are arranged in succession on the ring-shaped front face 58, so that the welding die 59 overall has an external diameter which is larger by at least 6 base lengths of a pyramid 65 than the diameter of the recess 63.

The following procedure has proved suitable for welding a cover film 49, the thickness 53 of which is about 0.1 mm, to a plate 2, the thickness 7 of which is about 0.27 mm:

The cover film 49 is placed from above onto the plate 2 in such a way that it covers the wells 11 and that the through-holes 50 are aligned with the through-holes 9. The welding die 59, which is heated to 280° C., is placed from above, with its front face 58 first, onto the upper side 51 of the cover film 49 in such a way that it is located centrally above a well 11 which is located below the cover film 49 and is to be welded. The pyramids 65 on the front face 58 now lie with their tips 67, which may penetrate somewhat into the material of the cover film 49, on the upper side 51 and heat the latter. The cover film 49 is pre-heated in this way for about 13 seconds by the honeycomb profile of the front face 58. The welding die 59 is then pressed downwards through about 0.1–0.2 mm onto the cover film 49, so that each pyramid 67 penetrates into the cover film 49 and this in turn penetrates into the bridges 29 of the plate 2. The welding die 59 remains in this position for two seconds and is then removed completely from the cover film 49.

Figure 8:
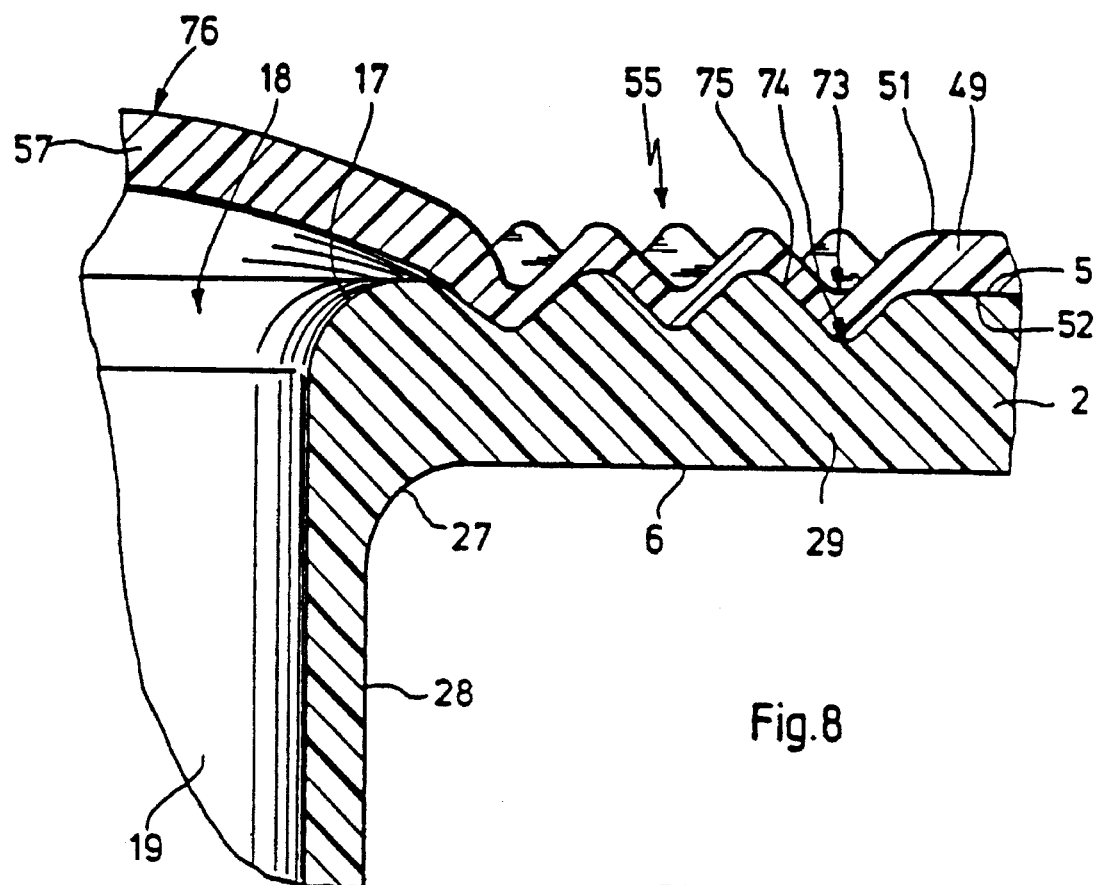
FIG. 8 shows the joining seam from FIG. 5, in a sectional side view along the line VIII—VIII from FIG. 5.

The joining seam 55 which is thus produced and which is a type of weld seam is shown in FIG. 8 in a cross-section along the line VIII—VIII from FIG. 5. The cooled down joining seam 55 has a profiling corresponding to that of the welding die 59. The pyramids 65 have pressed into the preheated upper side 51 of the cover film 49 upside-down pyramid-like depressions 73, which in respect of their shape correspond to the pyramids 65. In addition, in the region of the depressions 73, the cover film 49 has penetrated with its underside 52 into the upper side 5 of the bridges 29, which is indirectly preheated through the cover film 49, and has formed depressions 74, which correspond to the depressions 73, in said upper side 5. In this way a contact surface 75, which in cross-section has a zig-zag form, has formed between the underside 52 of the cover film 49 and the upper side 5 of the plate 2. As a result of this zig-zag shape, the contact surface 75 is larger than the bearings surface which existed before the welding between the underside 52 of the cover film 49 and the upper side 5 of the plate 2 in the envisaged region of the joining seam 55.

Not only has the bearing surface been enlarged by the heating action of the pyramids 65; the cover film 49 and the bridges 29 have also been integrally welded to one another along the contact surface 75. It has been found that this joining seam 55 ensures a good, not only liquid-tight but also gas-tight, seal of the individual wells 11 even in the case of frequent changing between high and low temperatures at the underside 6 or the outside 28. This even holds true in case a pressure above atmospheric arises inside of the wells due to the fact that the solutions placed in the wells are heated or carried to such a high temperature that the gas volume above the solution tends to expand. The joining seam 55 also withstands, without any problems, the customary mechanical stresses to which the sealed plate 2 is subjected in everyday laboratory practice, as well as the slight changes in shape and strains which are associated with changing the temperature.

During the welding operation described above, the circular section 57 of the cover film 49 which covers the opening 18 bulges upwards in a dome-like manner, so that a plate 2 which is sealed and welded as described above has a lens-like bulge 76 in the cover film 49 above each well 11.

Since, however, the bulge 76 is formed only in the case of wells 11 which are welded gas-tight, it is at the same time an optical indication that the joining seam 55 formed has provided a gas-tight seal of the relevant well 11, which seal is also capable of withstanding to an overpressure having arisen inside of the wells. If the cover film 49 does not display any bulges 76 after welding then, for example, the welding operation was defective in respect of the residence times, the temperature of the welding die 59 or the depth of penetration of the pyramids 65 into the upper side 51.

In the illustrative embodiment described, the temperature of the welding die 59, the dimensions of the pyramids 65 and the depth of penetration of the pyramids 65 into the upper side 51 of the cover film 49 are indicated merely by way of example for a cover film made of polycarbonate having a thickness of 0.27 mm. For thicker polycarbonate films, the depth of penetration of the pyramids, which approximately corresponds to the thickness of the cover film, must be adjusted to the new thicknesses.

Figure 9:
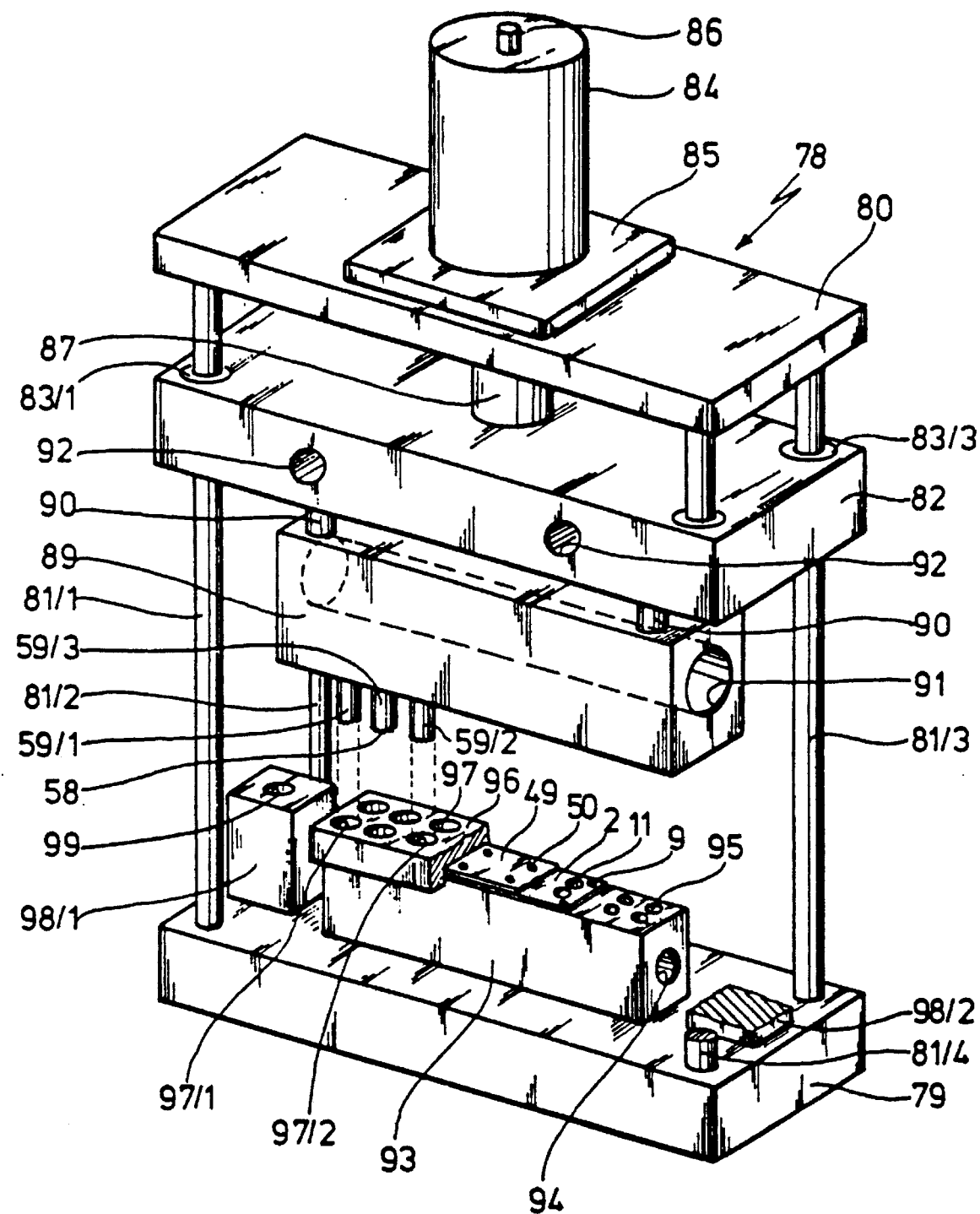
FIG. 9 shows an installation for welding the cover plate from FIG. 4, in which several of the welding dies from FIG. 6 are used, in a perspective view.

In addition to correctly maintaining the residence time of the welding die 59, initially on the upper side 51 and then in the position where it has penetrated into the upper side, the depth to which the pyramids 65 penetrate into the material of the cover film 49 is also important for the success of the welding operation. Although the welding operation described above can be carried out manually, the yield of correctly positioned joining seam 55 is substantially increased by the use of a welding installation 78 as shown in FIG. 9.

The welding installation 78 has a flat, rectangular baseplate 79 and a flat top plate 80, which is arranged above the baseplate 79 and has approximately the same transverse dimensions as the baseplate 79. The top plate 80 is fixed to the baseplate 79 with the aid of four guide rods 81. Of the four guide rods 81, which are screwed into the baseplate 79 from above, each in the region of one of the four corners, the front righthand guide rod 81/4 has been omitted from FIG. 9 for reasons of clarity in the drawing.

A support plate 82, the height of which is adjustable and in the outer corners of which spherical liners 83 are let in, through which the guide rods 81 pass, is provided between the baseplate 79 and the top plate 80. As drive for the height adjustment of the baseplate 82, an electrically operated drive motor 84 is attached, by its flange 85 from above on the top plate 80, remote from the baseplate 82. The motor 84 has a motor shaft, indicated at 86, which is connected to a ballscrew pinion gear indicated at 87. The ballscrew pinion gear 87 is connected on the other side to the support plate 82 and serves to translate the rotary movement of the motor shaft 86 into the adjusting movement of the support plate 82 along the guide rods 81.

Remote from the ballscrew pinion gear 87, a heating block 89, which is fixed from below to the support plate 82 by four distance bolts 90, is provided centrally below the support plate 82. The heating block 89, which is made of copper, fulfills the role of the heater indicated at 71 in FIG. 6 for the welding die 59, three of which are indicated in FIG. 9. The welding dies 59/1, 59/2 and 59/3 plug, remote from the distance bolts 90, from below into the heating block 89 and their front faces 58 face downwards away from the heating block 89.

A blind hole 91, in which an electrically heatable heating cartridge is inserted, which for reasons of clarity is not shown in more detail, is provided in the heating block 89 and in FIG. 9 passes virtually completely through said heating block from right to left. The temperature of the heating block 89 is suitably measured by a temperature probe, which is not shown in more detail, and passed to a control circuit, which is likewise not shown and which, in turn, controls the heating cartridge. A closed control circuit, via which the temperature of the heating block 89 is kept at a constant value, for example 280° C., is thus formed in a manner known per se. Via the distance bolts 90, the heating block 89 heats the support plate 82, which can result in jamming of the spherical liners 83 on the guide rods 81. For this reason, coolant bores 92, through which the support plate 82 is connected to a thermostat-controlled cooling circuit, are provided in the support plate 82. In this way, the temperature of the support plate 82 can be adjusted independently of the temperature of the heating block 89 via an external thermostat, so that a smooth-running adjustment of the support plate 82 along the guide rods 81 is ensured.

A receiving block 93, which faces upwards, is provided on the baseplate 79 approximately centrally below the heating block 89, the height of which can be adjusted via the support plate 82. The receiving block 93 has a coolant bore 94 which passes through it and which is connected, in the same way as the coolant bore 92 of the support plate 82, to an external thermostat circuit which keeps the receiving block 93 at a constant and adjustable temperature.

The receiving block 93 has cups 95 which are open at the top and are designed to receive the protuberances 21 projecting downwards beyond the plate 2. The cups 95 therefore have the same dimensions as the blind holes 38 which can be seen in FIG. 3 in the shaping block 37 and, like the wells 11, are arranged in rows 12 and columns 13.

A plate 2 is placed from above on the receiving block 93, which plate 2 is in turn covered by a cover film 49. A perforated mask 96, which engages around the receiving block 93 on all sides from above, is slipped over the cover film 49 and presses the cover film 49 onto the plate 2 and the latter, in turn, with its wells 11 into the receiving block 93. Through-holes 97, aligned with the welding die 59, are provided in the perforated mask 96, said holes likewise being arranged in rows 12 and columns 13 in such a way that one hole 97 is centrally aligned above each well 11. For reasons of clarity, the perforated mask 96, the cover film 49 and the plate 2 are shown broken off and offset relative to the receiving block 93.

Of course, a hole 97 and a welding die 59 are provided for each well 11 in the plate 2.

On either side of the receiving block 93 two identical upwardly facing pedestals 98 are arranged for fixing the perforated mask 96 on the baseplate 79, the righthand pedestal 98/2 of which is shown broken off. The pedestal 98/1 has a fixing bore 99, which faces upwards and to which a fixing clamp, which, for example, can be constructed as a spring clamp or as a locking bar, is fastened in order to press the perforated mask 96 downwards onto the receiving block 93.

For reasons of clarity, the fixing clamp has been omitted in FIG. 9.

The welding installation 78 which has been described thus far operates as follows:

The support plate 82 is in the raised starting position shown in FIG. 9. After the perforated mask 96 has been removed from the receiving block 93, a plate 2, to be welded, is placed from above on to the receiving block 93 in such a way that the wells 11 come to lie with their protuberances 21 in the cups 95. The wells 11, the openings 18 of which face upwards, are already filled with the desired substances and covered by a cover film 49, or are now appropriately filled and then covered with a cover film 49, which is aligned such that its through-holes 50 are aligned with the through-holes 9 in the plate 2. The perforated mask 96 is slipped over the plate 2 covered in this way, the through-holes 97 of said mask coming to lie centrally above the wells 11. With the aid of the fixing clamps provided on the pedestals 98, the perforated mask 96 is pressed firmly downwards onto the receiving block 93.

The heating block 89 is heated to 280° C. by means of the heating cartridge inserted in the blind hole 91. The welding dies 59, which are connected to the heating block 89 in a thermally conducting manner, also have this temperature. Via the ballscrew pinion gear 87, the rotary movement of the motor shaft 86 of the drive motor 84 is translated into a downwards movement of the support plate 82 guided via the spherical liners 83 and the guide rods 81. As the support plate 82 and thus the heating block 89 are lowered, the welding dies 59/1 and 59/2 push from above into the assigned holes 97/1 and 97/2 respectively in the perforated mask 96. The transmission of the ballscrew pinion gear 87 and the number of revolutions of the motor shaft 86 are set such that at the end of the downwards movement of the support plate 82 the welding dies 59 come to lie with their front face 58 or the tips 67 of the pyramids 65 just in contact with the upper side 51 of the cover film 49, as has already been described above.

The welding installation 78 pauses for about 13 seconds in this position, in which the welding dies 59 preheat the cover film 49 and the plate 2 in the area where the joining seams 55 are to be made. After this preheating time, the support plate 82 is gradually moved 0.1 mm further downwards towards the receiving block 93, via the ballscrew pinion gear 87 of the motor 84, so that the pyramids 65 on the front face 58 of the welding dies 59 penetrate into the cover film 49 and the latter penetrates into the bridges 29 of the plate 2. After a further two seconds, the motor 84 is driven such that its motor shaft 86 turns in the direction opposite to the previous direction of rotation and, via the ballscrew pinion gear 87, the support plate 82 and thus the heating block 89 and the welding dies 59 are thus raised again to the initial position shown in FIG. 9.

After loosening the fixing clamps, the perforated mask 96 can be removed and the plate 2, which is welded as shown in FIG. 5, is removed from the receiving block 93. The next plate 2 is now placed on the receiving block 93 and the welding operation begins anew.

For many experiments it is necessary to keep the substances placed in the wells 11 at low temperatures to prevent their being heated during the welding operation just described. For this purpose, the receiving block 93, and thus its cups 95, is thermostat-controlled via the coolant bore 94 to a temperature which is required for the particular substances, for example to 10° C. The wells 11 lie with their heat exchange surface 28' close against the inner wall of the particular cup 95, so that, because of the low thickness 31 of the wall 20 of the wells 11, the substances present in the wells 11 are kept at the same temperature as the receiving block 93 itself. Because of the good heat transfer, the heat which may be supplied to the substances during welding is instantaneously dissipated through the wall 20 into the receiving block 93.

In this way, substances which have a very sensitive reaction to temperature variations can also be welded in the wells 11 of the new plate 2 with the aid of the novel welding installation 78. Consequently it is possible, to a degree not known hitherto, to package temperature-sensitive substances or solutions, or highly infectious substances, gas-tight in a large number in an extremely small space. The substances can be, for example, reaction solutions prepared for biochemical and/or microbiological test methods, which are supplied to the user already in portioned and welded form in the novel plates 2. The substances to be tested by the user can, for example, be introduced into the test solutions present in the wells 11 by piercing the bulges 96, covering the openings 18 of the wells 11, from above using a thin hollow needle. The substances to be tested are then injected into the test solutions present in the wells 11.

After withdrawing the hollow needle, which, for example, is a syringe commonly used in everyday laboratory practice, a capillary-like channel remains in the bulge 76. Exchange of moisture with the surrounding atmosphere is not possible via this channel, so that the volume of the substances or solutions placed in the wells 11, which have been welded gas-tight, does not change as a result of condensation or evaporation effects.

Usually, however, the wells 11 of the novel plate 2 are filled in situ, for example in the chemical laboratory, and sealed gas-tight with a cover film 49 using the novel welding installation. The fixed grid pattern of the columns 13 and rows 12 makes it possible, with this procedure, to fill several wells 11 at the same time using a multiple pipette known per se.

Figure 10:
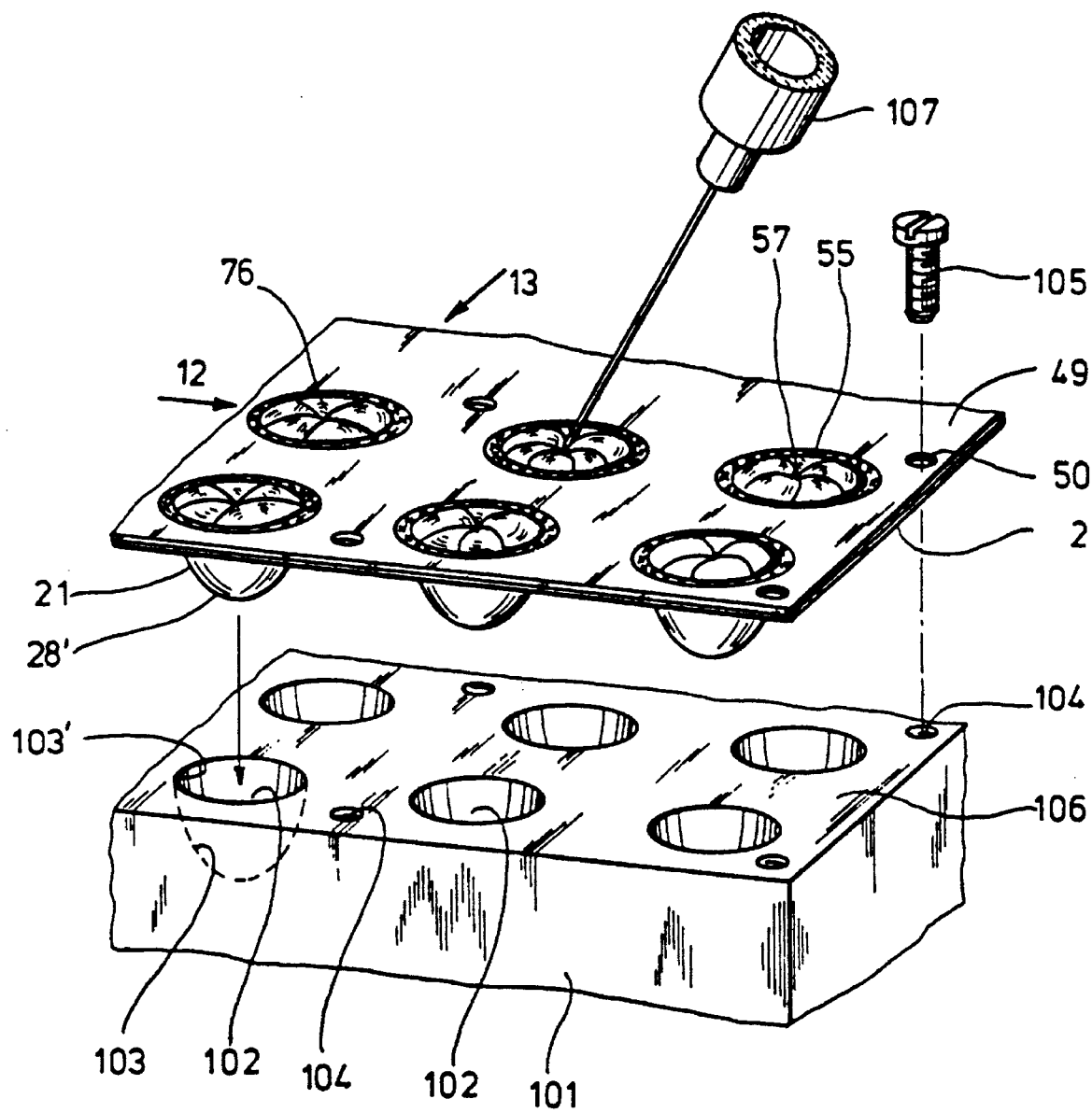
FIG. 10 shows the use of the welded plate from FIG. 5 in combination with a thermoblock in a perspective view and in section.

Fig. 10 shows a plate 2 with wells 11, sealed gas-tight, in which, for example, solutions are present, the course of reaction of which can be influenced via their temperature. The solutions have either been filled into the wells 11 in situ or were already in the plate 2, supplied as a welded plate, and were subsequently inoculated by the user with the substances to be tested—for example DNA molecules to be tested.

The plate 2 prepared in this way is inserted from above into a thermoblock 101 which has blind holes 102 which are open at the top and serve to receive the beaker-like protuberances 21. The blind holes 102 have the same shape as the blind holes 38 in the shaping block 37 used to produce the plate 2. After the protuberances 21 have been inserted in the blind holes 102, the inner wall 103 of said blind holes lies directly against the heat transfer surface 28' of the protuberances 21. Therefore there are no layers of air between the outside 28 and the inner wall 103, which acts as counter-surface 103', interfering with the heat transfer between the thermoblock 101 and the interior 19 of the wells 11.

Threaded holes 104, which are open towards the top, are also provided in the thermoblock and, when the plate 2 is inserted in the thermoblock 101, align with the through-holes 50 and 9 in the cover film 49 and in the plate 2, respectively. Screws 105 are screwed into the threaded holes 104 from above through the through-holes 50 and 9, and the plate 2 sealed with the cover film 49 is thus firmly connected to the thermoblock 101. The upper side 106 of the thermoblock 101 comes to lie tightly against the underside 6 of the plate 2 and the protuberances 21 are pressed firmly with their heat exchange surface 28' on the inner wall 103 of the blind holes 102.

Because of the smooth surface of the outside 28, which is in direct thermal contact with the inner wall 103, and because of the high heat transmission coefficient described, the solutions present in the wells 11 assume the temperature of the thermoblock 101 within a few seconds. If the solutions are, for example, to be stored for a prolonged period at a low temperature, the thermoblock 101, which is made of a metal having good thermal conductivity, is temperature controlled, for example to +4° C., via a thermostat connected to it.

If the reaction in the solutions is to be initiated, the thermoblock 101 is heated in a suitable manner to the reaction temperature of the solutions, which, because of the good heat transfer, follow the temperature change in the thermoblock 101 virtually immediately. The temperature change in the thermoblock 101 itself can be effected in a manner known per se by immersing the thermoblock 101 in water baths of different temperatures, by bringing the thermoblock 101 into heat-conducting contact with further metal blocks pre-regulated to the desired temperature, or by moving the thermoblock 101 along a metal rail on which a temperature gradient has been established.

In particular the metal rail with the temperature gradient makes possible the cyclic changing of the temperature of the thermoblock 101 and thus of the temperature of the solutions in the wells 11. For carrying out the polymerase chain reaction in the wells 11, the thermoblock 101 is, for example, first kept at 37° C. for 60 seconds, then at 72° C. for 120 seconds, then at 94° C. for 60 seconds and then again at 37° C. for 60 seconds, etc. Due to the even at overpressure gas-tight seal of the single wells, even at the high temperatures no water vapour saturated gas can escape from inside the wells. The amount of water vapour in the air volume above the solution placed in the well is controlled by the fluid, however, since no air can escape, this will not lead to any evaporation processes, so that the initial concentration of the solutions will not vary during the great number of temperature cycles. This provides for a good yield of the experiment.

The time which is needed to bring the solutions to the individual temperatures is decisive for the course of the polymerase chain reaction. Whereas a typical course of reaction in the known plastic reaction vessels takes more than 10 hours and is usually carried out overnight, when the new plate 2 is used the reaction is complete in less than 4 hours. An experiment of this type can, therefore, now be prepared, carried out and analyzed within one day.

After the experiment has proceeded to completion the solutions are at least partially further used, for example to analyze them on a separating gel. For this purpose, the bulge 76 is punctured using the syringe indicated at 107 in FIG. 10 and a portion of the solution is removed. After withdrawing the syringe 107, the solution remaining in the well 11 can be stored, for example in the manner described above. Although the hole formed in the bulge 76 during sampling does not result in any significant exchange of moisture, it can subsequently be sealed again, for example using an adhesive film.

Finally, it may be mentioned, solely for the sake of completeness, that the transverse dimensions of the new plate 2, and also the row and column spacings 14 and 15 respectively, essentially depend on the fill volume 33 of the wells 11 which is desired in the particular case. The thermoblocks 101, receiving blocks 93 and shaping blocks 37 used in each case are adapted to these spacings. In every case, however, the thickness of the film 36 is so chosen that the wells 11 in the finished plate 2 have a bottom wall 24 which has a thickness 31 in the region of 0.04 mm, so that the heat transfer co-efficient has the necessary high value.

We claim:

1. A process for sealing at least one well out of a number of wells having openings facing upwards, said wells being provided in a plate means and serving to receive chemical and/or biochemical and/or microbiological substances, the openings having their orifices in the upper side of said plate means, wherein the process comprises the steps of:

a) placing said plate means with said wells facing upwards onto a receiving member having means for receiving said wells so that said plate means contacts an upper face of said receiving member, b) placing a heat deformable coverplate from a thermoplastic resin sheet on said upper side of said plate means, at least said opening of said at least one well to be sealed being covered by an area of said coverplate, which coverplate has an upper side facing upwards, and then c) providing a joining seam running at least around said opening of said well to be sealed and joining at least the area, covering said opening of said well with said coverplate, said joining seam having a profiled cross-section in order to increase the contact surface between said upper side of said plate means and said coverplate, by the following steps:

ba) providing a welding die member having a front face above said receiving member so that said front face thereof opposes said upper face of said receiving member, bb) providing one of said opposing faces with a substantially flat surface and the other of said opposing faces with projecting profiled regions, wherein at least said other face is heated to a temperature which is in the region of the melting point of, at least, said coverplate, bc) bringing the opposing faces of said welding die member and said receiving member together so that said front face of said welding die member contacts said upper side of said coverplate, said profiled regions coming into contact with one of said upper side of said coverplate or said plate means in the area around said opening; then bd) pressing said welding die member and said receiving member together through a fixed path so that said profiled regions at least penetrate into said coverplate; and then d) separating said welding die member from said receiving member.

2. The process according to claim 1, wherein said front face of said welding die member is provided with said projecting profiled regions.

3. The process according to claim 2, wherein the provision of the joining seam comprises the provision of a joining seam which is closed in itself.

4. The process according to claim 3, wherein the provision of said joining seam comprises the provision of a join which is positive-locking, at least in sections, between said plate means and said coverplate.

5. The process according to claim 3, wherein said joining seam seals said well gas-tight.

6. The process according to claim 2, wherein an individual joining seam is provided for each of said wells.

7. The process according to claim 2, wherein said receiving member is kept at a fixed temperature and said wells are brought into thermal contact with said receiving member when they are placed on the latter.

8. The process according to claim 7, wherein a holding device is placed from above onto said coverplate before said welding die member is placed in position, which holding device presses said coverplate onto said upper side of said plate means and brings said wells into thermal contact with said receiving member.

9. The process according to claim 2, wherein said plate means is produced from a thin polycarbonate film having a thickness of less than 0.5 mm, wherein said coverplate is produced from a thin polycarbonate film having a thickness of less than 0.3 mm, wherein said wells have a wall with a thickness of less than 0.08 mm and a volume smaller than 200 mm$^3$, and wherein said temperature of said welding die member is between 250° and 300°.

10. The process according to claim 2, wherein said fixed path is approximately equal to the thickness of said coverplate.

11. A process according to claim 2 wherein during pressing the welding die member and receiving member together, through the action of said welding die member material of said cover plate partially penetrates into the upper side of the plate means.

* * * * *

UNITED STATES PATENT AND TRADEMARK OFFICE
CERTIFICATE OF CORRECTION

PATENT NO. : 5,582,665
DATED : December 10, 1996
INVENTOR(S) : Manfred Eigen et al.

It is certified that error appears in the above-indentified patent and that said Letters Patent is hereby corrected as shown below:

Column 18, line 45, claim 1, after "coverplate", insert --made--.

Signed and Sealed this

Twenty-fifth Day of March, 1997

Attest:

BRUCE LEHMAN

Attesting Officer     *Commissioner of Patents and Trademarks*